(12) United States Patent
Bhandarkar et al.

(10) Patent No.: US 10,868,725 B2
(45) Date of Patent: Dec. 15, 2020

(54) EXTENSIBLE PLUG-N-PLAY POLICY DECISION FRAMEWORK FOR NETWORK DEVICES USING AHEAD OF TIME COMPILATION

(71) Applicant: RtBrick Inc., Princeton, NJ (US)

(72) Inventors: Pravin S. Bhandarkar, Bangalore (IN); Hannes Gredler, Pillberg (AT); Deepak J. Gowda, Bangalore (IN)

(*) Notice: Subject to any disclaimer, the term of this patent is extended or adjusted under 35 U.S.C. 154(b) by 104 days.

(21) Appl. No.: 16/032,450

(22) Filed: Jul. 11, 2018

(65) Prior Publication Data
US 2019/0020546 A1    Jan. 17, 2019

Related U.S. Application Data

(60) Provisional application No. 62/531,659, filed on Jul. 12, 2017.

(51) Int. Cl.
*H04L 12/24* (2006.01)
*G06F 8/30* (2018.01)
(Continued)

(52) U.S. Cl.
CPC ............ *H04L 41/0893* (2013.01); *G06F 8/30* (2013.01); *G06F 8/65* (2013.01); *G06F 21/64* (2013.01);
(Continued)

(58) Field of Classification Search
CPC .......... G06F 8/41; G06F 21/604; G06F 21/64; G06F 8/30; G06F 8/65; H04L 41/082; H04L 9/0643; H04L 9/3239
(Continued)

(56) References Cited

U.S. PATENT DOCUMENTS

| | | | |
|---|---|---|---|
| 8,272,025 B1* | 9/2012 | Burnham | G06N 5/025 726/1 |
| 8,341,691 B2* | 12/2012 | Bezilla | G06F 21/552 726/1 |

(Continued)

OTHER PUBLICATIONS

Xitao Wen, Chunxiao Diao, Xun Zhao, Yan Chen, Li Erran Li, Bo Yang, and Kai Bu. 2014. Compiling minimum incremental update for modular SDN languages. In Proceedings of the third workshop on Hot topics in software defined networking (HotSDN '14). Association for Computing Machinery, New York, NY, USA. (Year: 2014).*

*Primary Examiner* — John M Macilwinen

(57) ABSTRACT

A policy server may include a policy parser that is communicably coupled to a configuration database. The policy parser may identify a policy data model in the configuration database associated with a policy. The policy data model may include a policy object expressed in a human-readable format. The policy server may include a policy engine for constructing a dynamic acyclic graph (DAG) representing the policy data model. The policy engine may include a code generation engine for parsing the DAG to generate code in a high-level language. The policy engine may include a compiler for compiling the generated code to generate binaries for implementing the policy. The policy server may include a policy dispatcher for generating a notification to a policy client to dispatch the binaries to at least one subscriber of the policy following the code being compiled. The policy server may asynchronously update the policy for the subscribers.

20 Claims, 9 Drawing Sheets

(51) Int. Cl.
*H04L 9/06* (2006.01)
*H04L 9/32* (2006.01)
*G06F 8/65* (2018.01)
*G06F 21/64* (2013.01)
*G06F 8/41* (2018.01)

(52) U.S. Cl.
CPC .......... *H04L 9/0643* (2013.01); *H04L 9/3239* (2013.01); *G06F 8/41* (2013.01)

(58) Field of Classification Search
USPC .......................................................... 709/220
See application file for complete search history.

(56) References Cited

U.S. PATENT DOCUMENTS

2007/0150936 A1* 6/2007 Maes ...................... H04L 67/10
 726/1
2008/0066150 A1* 3/2008 Lim ....................... G06F 21/604
 726/1
2013/0332449 A1* 12/2013 Amos ........................ G06F 9/44
 707/714
2017/0295188 A1* 10/2017 David ................. H04L 63/0428
2018/0089249 A1* 3/2018 Collins ................. G06F 16/282

\* cited by examiner

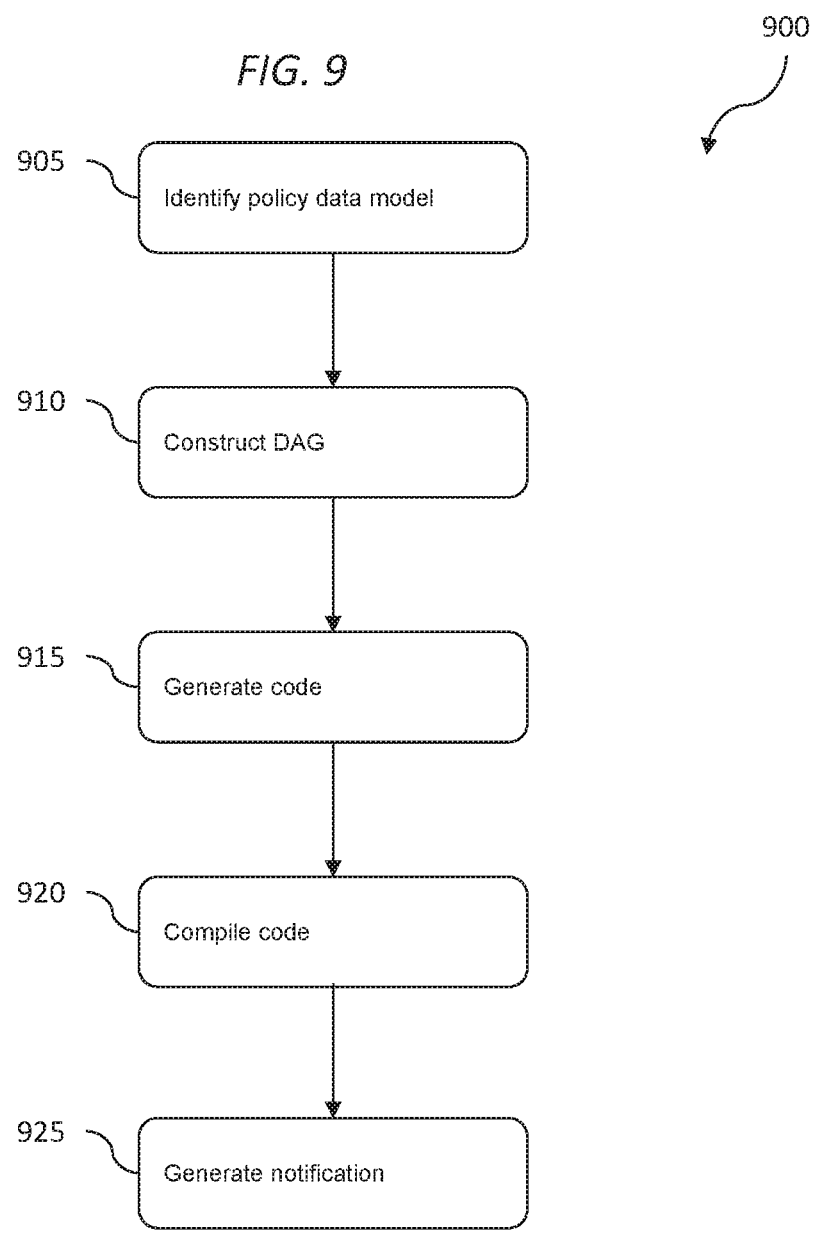

EXTENSIBLE PLUG-N-PLAY POLICY DECISION FRAMEWORK FOR NETWORK DEVICES USING AHEAD OF TIME COMPILATION

CROSS-REFERENCE TO RELATED APPLICATIONS

The present application claims the benefit of and priority to U.S. Provisional Pat. Appl. Ser. No. 62/531,659, filed Jul. 12, 2017, and titled "EXTENSIBLE FRAMEWORK FOR ROUTING POLICY ON NETWORK DEVICES USING AHEAD OF TIME COMPILATION," the contents of which are incorporated herein by reference.

FIELD OF THE DISCLOSURE

The present application generally relates to distributed and highly scaled network devices (e.g., a router, cluster of servers), including but not limited to systems and methods for generating and providing network policies to network devices.

BACKGROUND

In many network devices, a routing policy is a separate application or a static library that runs on a device, and emphasis is laid on expressiveness of policy objects and flexibility to combine these objects to create policy rules. However, such policy generation is typically static in that new policy objects are not easily incorporated into an existing policy. Additionally, users, such as network administrators, may not have visibility in the underlying code for enforcing the policy.

BRIEF SUMMARY

The present disclosure is directed towards systems and methods for generating and implementing a policy for network devices. A policy server may include a policy parser that is communicably coupled to a configuration database. The policy parser may identify a policy data model in the configuration database associated with a policy. The policy data model may include a policy object expressed in a human-readable format. The policy server may include a policy engine configured to construct a dynamic acyclic graph (DAG) representing the policy data model. The policy engine may include a code generation engine configured to parse the DAG to generate code in a high-level language. The policy engine may include a compiler configured to compile the generated code to generate binaries for implementing the policy. The policy server may include a policy dispatcher configured to generate a notification to a policy client to dispatch the binaries to at least one subscriber of the policy following the code being compiled. The policy server may asynchronously update the policy for the subscribers.

In one aspect, this disclosure is directed to an extensible policy processing framework on a network device. The framework can include storage of policy definitions in JSON format. The framework can include receiving updates via regular-expression parsing of a publish-subscribe channel. The framework can include a JSON policy parser to evaluate the rules. The framework can include a software job scheduling utility. The framework can include a finite state machine. The framework can include a code generator for generating code for a policy and accessors. The framework can include a client module that integrates with the application. The framework can include a subscription mechanism that allows for registration of interest. The framework can include a notification mechanism and a set of call-back function installed by one or more utility applications.

In some embodiments, upon a configuration of the policy being updated, a software scheduler triggers a job, which is a software quantum of work thereby ensuring pacing of policy processing. In some embodiments, the underlying policy objects are converted to a Directed Acyclic Graph (DAG) that captures all the processing policy objects as nodes. The DAG captures relationships between objects of various tables. The DAG flattens the policy object hierarchy and triggers code generation.

In some embodiments, code is generated to take the policy objects called root nodes and calling functions in the leaf nodes, which has accessors, namely getter and setter functions. In some embodiments, a policy-server and policy-client are completely decoupled, which provides for plug-n-play of external code, thereby permitting end-user intent to be transmitted through a code-generation and hand-written code framework.

In some embodiments, the framework includes a code generation engine that uses a combination of container nodes, control nodes and programming nodes, where the container nodes map the policy to a file name, the control nodes represent the first node in the ordinal/sub-ordinal combination, and programming nodes maps language from the control nodes to a high-level programming language like C. In some embodiments, the policy server performs Ahead of Time (AoT) compilation of the generated C code to generate a dynamic library per policy entry table. The accessor functions, if processed by code generation engine, are added to a helper static library that is linked to the dynamic library and includes filters to be implemented in the data-plane.

In some embodiments, the policy client receives a notification upon an update to the policy code, which is then compared with an underlying subscription table where client applications register interest in specific policies. The notification can be obtained through a publish subscribe mechanism, a notification from Linux iNotify, or an equivalent service. The notification may cause a pre-registered callback function to be invoked in the client application, which may trigger a set of processing calling into the dynamic library associated with the policy to process a policy.

In some embodiments, each of the embodiments described above may be integrated into a method to create a multi-stage policy processing pipeline for policy processing in the control and data plane. In some embodiments, accessor code may be generated independent of the root node code, which is generated by the framework thereby allowing plug-n-play ability to substitute stages of the pipeline with user specific nodes. In some embodiments, all of the elements of a DAG graph may be combined and all the relationships in space may be flattened, allowing for policy code generation.

In some embodiments, the framework provides for flexibility to process data plane filters and allows code to be generated for data plane in an optimized format, like e-BPF, BPF or ASIC specific filters. In some embodiments, a user may review the progress of policy processing through each of the stage and profile policy code using tool chains or user-built tool-chains and optimize the accessor code for optimized processing. The user may be provided visibility into the policy and its implication.

In some embodiments, the framework may provide for multiple policy binaries to be created and ready to be applied in response to streaming data telemetry or network sensitive input thereby allowing a closed loop control between policy for applications and the network. In some embodiments, the framework works together as a system using a combination of steps described in the above-mentioned embodiments to form an extensible policy framework with Ahead of Time (AoT) compilation.

In another aspect, this disclosure is directed to a method of implementing a policy for a networking device. The method can include identifying, by a policy parser of a policy server, a policy data model in a configuration database associated with a policy. The policy data model can include a policy object expressed in a human-readable format. The method can include constructing, by a policy engine of the policy server from the policy data model, a dynamic acyclic graph (DAG) representing the policy data model. The method can include parsing, by a code generation engine of the policy engine, the DAG to generate code in a high-level language. The method can include compiling, by the policy engine, the code to generate binaries for implementing the policy. The method can include generating, by a policy dispatcher, a notification for a policy client to dispatch the binaries to at least one subscriber of the policy following the code being compiled, to asynchronously update the policy for the subscriber.

In some embodiments, the policy object includes an ordinal and sub-ordinal which define an order in which commands are evaluated and sent to the code generation engine. In some embodiments, the policy object is expressed in JavaScript Object Notation (JSON). In some embodiments, the policy data model includes two or more objects, at least one object being a root object and at least one object being a leaf object. In some embodiments, the root object is represented in a policy table, and the leaf object is represented in a foreign table. In some embodiments, the foreign table is any one of an external in-memory database, a relational database, a graph database, or a NoSQL database.

In some embodiments, generating, by the policy dispatcher, the notification includes generating, by the policy dispatcher, an update to a global notification table. The policy client may be configured to monitor the global notification table to identify the update corresponding to the policy. In some embodiments, compiling, by the policy engine, the code to generate binaries for implementing the policy includes compiling, by the policy engine using an Ahead of Time (AoT) compiler, the code to generate the binaries for implementing the policy. In some embodiments, the policy object further includes a security measure for auditing the policy. In some embodiments, the security measure is a policy hash, such as a SHA512 value generated by running a hashing algorithm on the binary.

In another aspect, this disclosure is directed to a policy server for generating a policy. The policy server can include a policy parser communicably coupled to a configuration database. The policy parse can identify a policy data model in the configuration database associated with a policy. The policy data model can include a policy object expressed in a human-readable format. The policy server can include a policy engine configured to construct a dynamic acyclic graph (DAG) representing the policy data model. The policy engine can include a code generation engine configured to parse the DAG to generate code in a high-level language. The policy engine can include a compiler configured to compile to generated code to generate binaries for implementing the policy. The policy server can include a policy dispatcher configured to generate a notification to a policy client to dispatch the binaries to at least one subscriber of the policy following the code being compiled, to asynchronously update the policy for the subscriber.

In some embodiments, the policy object includes an ordinal and sub-ordinal which define an order in which commands are evaluated and sent to the code generation engine. In some embodiments, the policy object is expressed in JavaScript Object Notation (JSON). In some embodiments, the policy data model includes two or more objects, at least one object being a root object and at least one object being a leaf object. In some embodiments, the root object is represented in a policy table, and the leaf object is represented in a foreign table. In some embodiments, the foreign table is any one of an external in-memory database, a relational database, a graph database, or a NoSQL database.

In some embodiments, the policy dispatcher is configured to generate the notification to the policy client by generating, by the policy dispatcher, an update to a global notification table. The policy client can be configured to monitor the global notification table to identify the update corresponding to the policy. In some embodiments, the compiler is an Ahead of Time (AoT) compiler. In some embodiments, the policy object further includes a security measure for auditing the policy. In some embodiments, the security measure is a policy hash, such as a SHA512 value generated by running a hashing algorithm on the binary.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 9 is a flow diagram of an embodiment of a method of implementing a policy for a network device.

Figure 1:
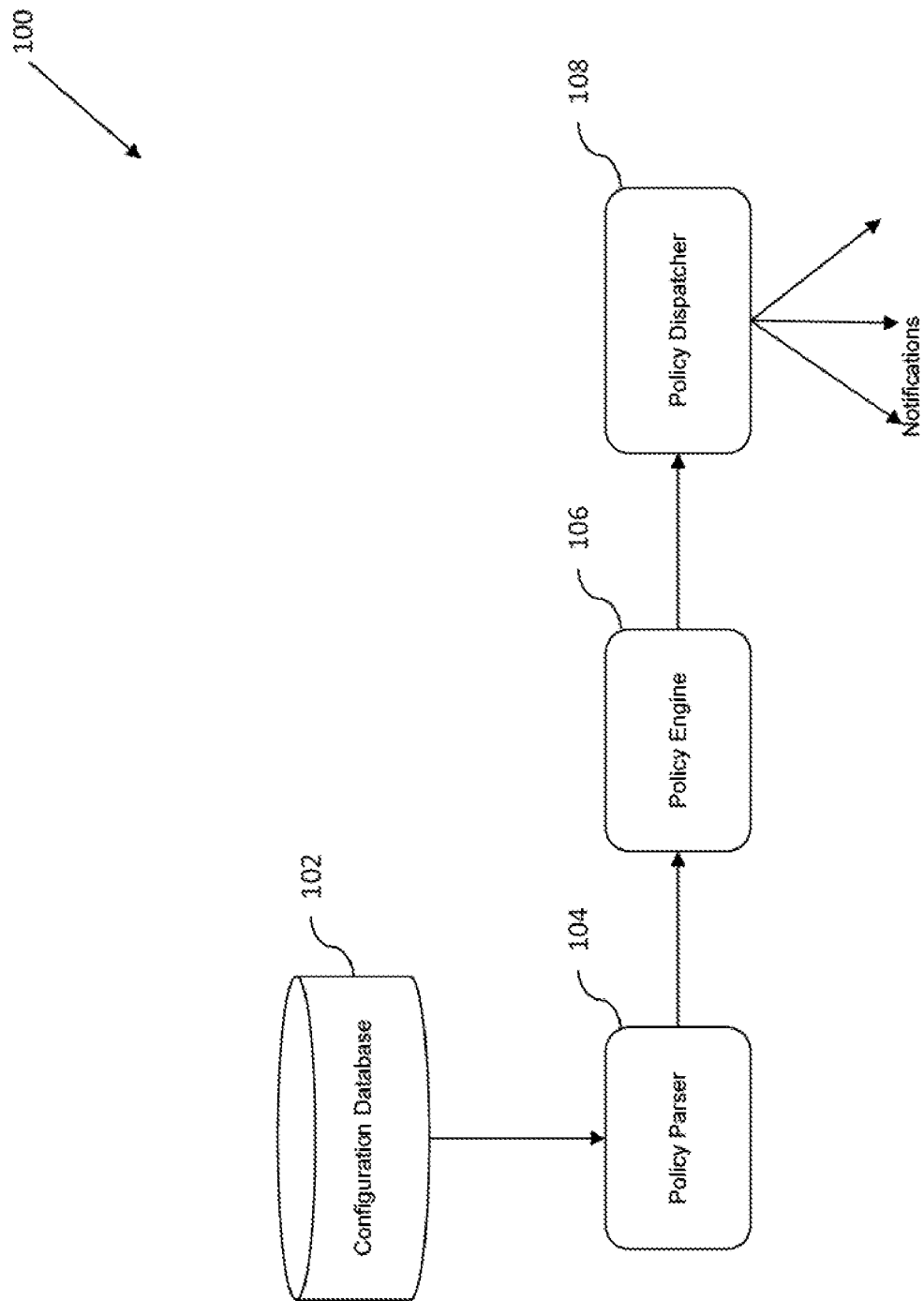
FIG. 1 is a block diagram of a policy processing pipeline.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present disclosure is directed towards systems and methods for generating and implementing a policy for network devices. A policy server may include a policy parser that is communicably coupled to a configuration database. The policy parser may identify a policy data model in the configuration database associated with a policy. The policy data model may include a policy object expressed in a human-readable format. The policy server may include a policy engine configured to construct a dynamic acyclic graph (DAG) representing the policy data model. The policy engine may include a code generation engine configured to parse the DAG to generate code in a high-level language. The policy engine may include a compiler configured to compile the generated code to generate binaries for implementing the policy. The policy server may include a policy dispatcher configured to generate a notification to a policy client to dispatch the binaries to at least one subscriber of the policy following the code being compiled. The policy server may asynchronously update the policy for the subscribers.

Referring to FIG. 1, depicted is a block diagram of a policy processing pipeline 100. The policy processing pipeline 100 includes a configuration database 102, a policy parser 104, a policy engine 106, and a policy dispatcher 108. The configuration database 102, policy parser 104, policy engine 106, and policy dispatcher 108 may each be located on a policy server 502 (of FIG. 5). The policy parser 104 may identify rules which define policies in the configuration database 102. A user may operate an application, such as a configuration application (also referred to as a configuration daemon), to input or otherwise provide various rules and relationships to the configuration database. The rules may be represented in tables and include corresponding relationships. The policy parser 104 may convert the rules and tables into objects. The policy engine 106 may identify the objects from the policy parser 104. The policy engine 106 may convert the objects into a dynamic acyclic graph (DAG). The DAG may include a graph of nodes. Each node may represent the policy objects, and connectors may represent their corresponding relationships within the DAG. The policy engine 106 may generate code from the DAG. The code may be a high-level programming language, such as C. The policy engine 106 may compile the code to build a binary, which implements the intent of the policy. The policy dispatcher 108 may generate notifications to subscribers of the policy, which are dispatched to the subscribers. The subscribers may be located at a policy client 504 (of FIG. 5), which may be communicably coupled to, interoperate with, or otherwise work with the policy server 502. The subscribers may then access, download, install, implement, or otherwise use the revised policy.

Each of the above-mentioned elements or entities is implemented in hardware, or a combination of hardware and software, in one or more embodiments. Each component of the system 1100 may be implemented using hardware or a combination of hardware or software detailed above in connection with FIG. 1. For instance, each of these elements or entities can include any application, program, library, script, task, service, process or any type and form of executable instructions executing on hardware of the subscribers, the policy server, etc. The hardware includes circuitry such as one or more processors in one or more embodiments.

The configuration database 102 may store a number of tables. Each table may include a set of rules. The rules may be updated, modified, revised, added, substituted, or otherwise manipulated by a user, such as a network administrator. In some embodiments, the user may add new tables, remove or revise tables, etc. Thus, the tables and/or rules may be modifiable by the user according to various design and/or network needs. The rules may be defined, written, or otherwise represented in a format. For instance, the rules may be defined in JavaScript Object Notation (JSON), or other structured object definition language or format. Each rule may have a corresponding relationship to other rules within the same table, other rules in different tables, and/or other tables, generally.

The policy parser 104 may be designed or implemented to convert the rules and relationships into policy objects. Each object may include an ordinal and one or more sub-ordinal(s). The ordinal and sub-ordinal(s) may define an order in which commands are to be executed (e.g., by the policy engine 106). For instance, an ordinal and sub-ordinal associated with a particular object may map the object to an instruction. The instruction may have operators, such as "match" and "action" commands. The "match" and "action" commands may together constitute a term of the policy. "Term", as used herein with reference to the policy, may be an atomic unit of execution of a policy which can be executed either independently using a parameter (e.g., called an inline value), or referencing another table in the policy data model (e.g., called a named set). In some embodiments, an object may include a plurality of sub-ordinals, where the first sub-ordinal of a new table under an ordinal may be a root of a DAG (e.g., as described below in reference to the policy engine 106), and subsequent sub-ordinal objects may complete the layout of the DAG.

According to at least some embodiments described herein, policy filters may be configured via a policy data model and translated by a forwarding daemon (FWDD) into hardware/software-specific rules. Policy filters may be similar to forwarding filters which are created specifically for hardware and can be mapped to hardware-specific highly optimized binary which may reside in packet processing path.

According to the embodiments described herein, the basic building blocks of a policy may be a policy entry, or object, which is an instruction that specifies a match condition. The match condition may match an instruction with an inline value, a value in a foreign table, etc. An action condition may set an inline value based on an evaluation decision (e.g., according to the policy). Various actions may include accept, deny, sample, next-term, count, done, etc.

Policy entries may be combined in a way specified by a map object which describes a match-logic-map, and therefore allows combining terms using "and," "not" and "or" logical operators. Such embodiments allow specification of the policy based on the type of policy entry, and routing policy may be specified via keyword route. Similarly, a data plane policy may be specified by keyword data to set a filter for the data plane.

A control plane policy may be driven by definitions in the policy table. The control plane policy may use combinations of matching operators using set data with traditional Boolean logic operators (e.g., "and," "or" and "not") to conditional expressions. All matching operations may return a "True" or "False."

Thus, the execution of these conditional expressions and their associated actions may be controlled by using logic statements, such as if-then, else-if, and else statements or structures. Such embodiments permit a user to evaluate paths through the policy, and for the user to specify the evaluation policy.

As described above, the data plane policy may be driven by a filter. The filter may include an ordinal and sub-ordinal(s) which drive the order of execution. Additionally, the filter may include parameters for expression, such as SMAC and DMAC. The filter may be applied to source and/or destination addresses (e.g. source IPv4 address and/or IPv6 address, destination Ipv4 address and/or IPv6 address). Additionally, the filter may be applied to VLAN identifiers, IP protocol parameters and TCP flags. The data plane policy may execute a number of actions based on the filter including, for instance, reject, accept, log, sample, permit, police and/or deny actions.

Figure 2:
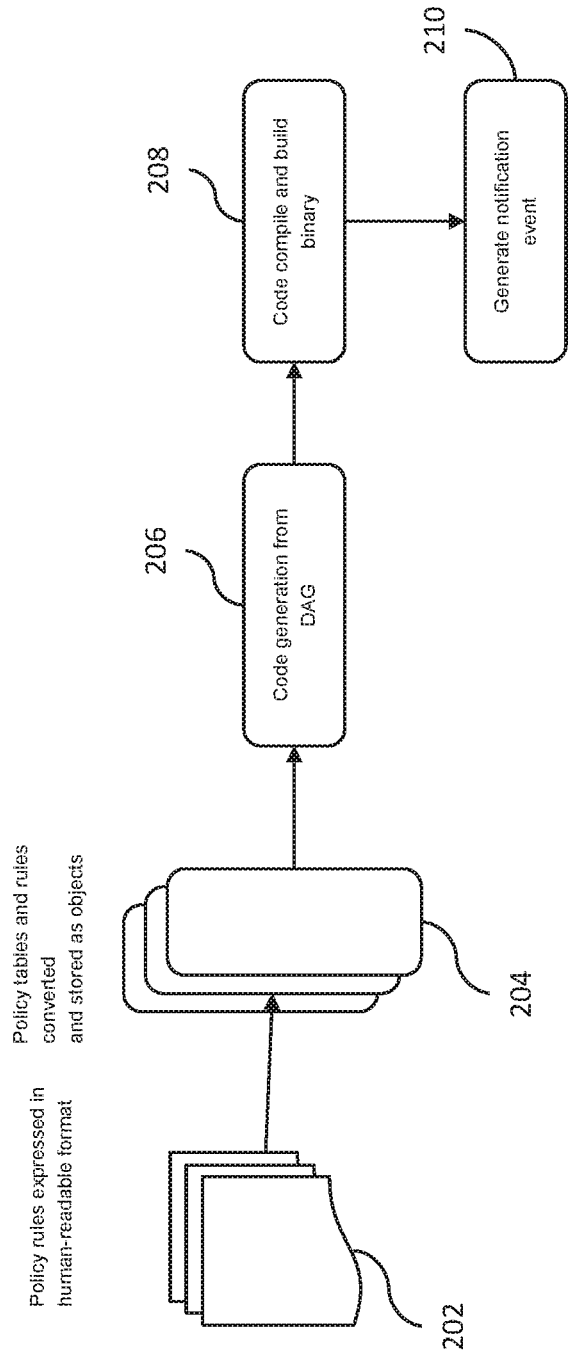
FIG. 2 is a block diagram showing a policy server processing pipeline.

Referring to FIG. 2, depicted is a block diagram 200 showing a policy server processing pipeline. Policy rules are expressed in human readable format at block (202). The policy tables and rules are converted to objects at block (204). The objects may be represented as a DAG. Code is generated from the DAG at block (206). The code may be compiled at block (208). The code may be compiled to build a binary. A notification is distributed to policy clients at block (210), as described below.

In some embodiments, policy rules may be expressed in the configuration database 102. The policy rules may be expressed in a human-readable format, such as JSON. The policy rules may be represented in corresponding policy tables. The policy parser 104 may parse the policy rules and tables to convert the rules and relationships in the policy tables to objects. The policy engine 106 may generate a DAG using the policy objects. The DAG may be a graph of nodes which maps object relationships. The policy engine 106 may parse the DAG to generate code in a high-level language (like C, for instance). The policy engine 106 may compile the code generated from parsing the DAG into binaries.

Figure 3:
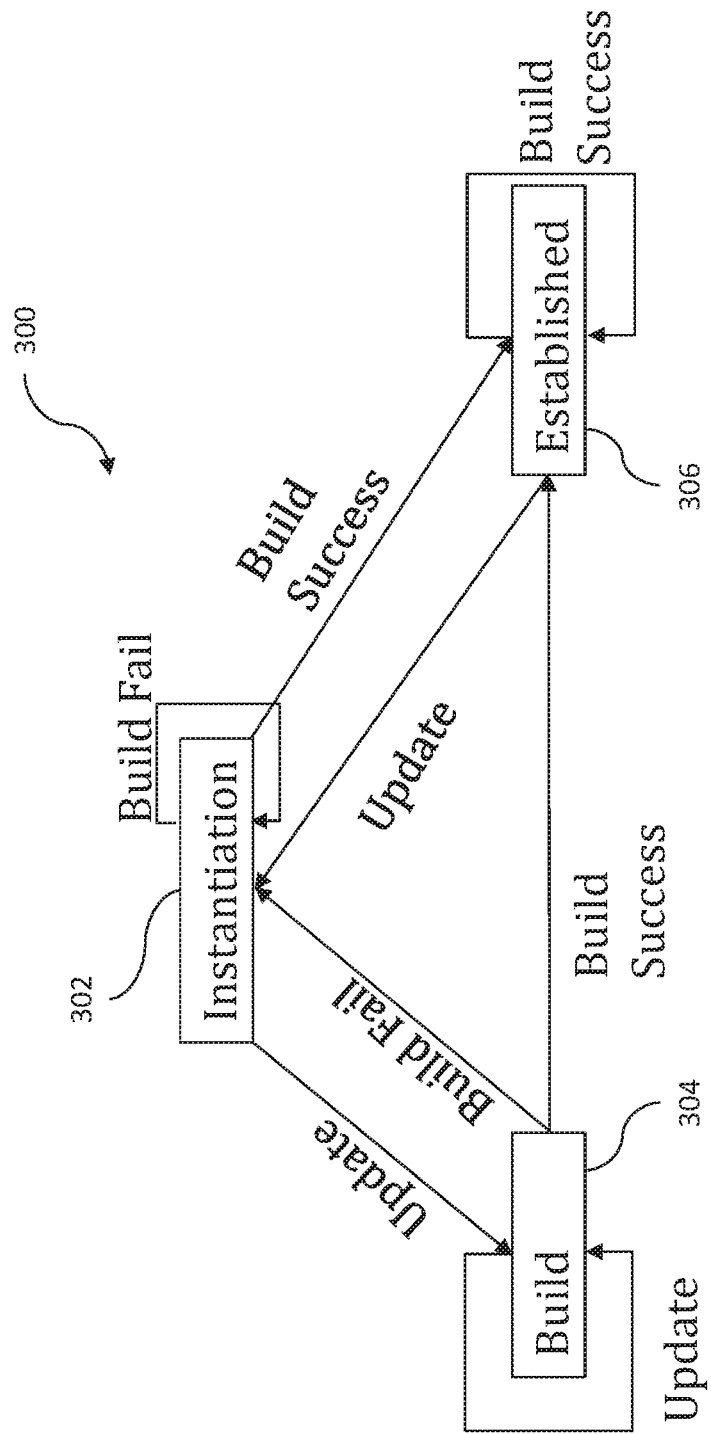
FIG. 3 is a state machine for tracking code generation for a policy table.

In some embodiments, code generation and compiling may be tracked via a state machine. Specifically, referring to FIG. 3, depicted is an embodiment of a state machine 300 for tracking code generation for a policy table. Each table may have a policy state and a policy hash, such as a SHA512 hash generated on the policy binary. The policy state may indicate whether the policy table is in an instantiated state 302, a build state 304, or an established state 306. The instantiated state may indicate that the policy table is defined and one or more objects in the table are instantiated. The build state may indicate that the policy table is being parsed, a DAG is being generated, code is being generated, and/or code is being compiled. Accordingly, the build state may generally indicate that the code for the portion of the policy represented in the policy table is being built. The established state may indicate that compilation of the policy for the table is successful (e.g., the policy is ready for processing). In some embodiments, only policies in the established state are to be processed by the policy client. As is shown in FIG. 3, the state machine 300 may loop between the instantiation state 302, the build state 304, and established state 306 when updates to the policy table are identified (e.g., by the policy parser 104, as described in detail below), when a build fails, and/or when a build is successful.

The policy hash may permit a policy client to audit the policy. The policy hash may be, for instance, SHA-512 (a 512-bit value generated using the SHA512 algorithm). The policy hash may maintain consistency between an object file (for instance a shared object, or .so, file) in a directory and the value computed in the table (e.g., the internal value of the hash). The policy hash may act as a security measure which prevents malicious or inadvertent changes to a policy and excludes policy processing on such changes, thereby preventing or inhibiting collateral damage.

Table 1 includes various policy objects and table types, their applicability, and their various characteristics.

TABLE 1

| Policy Object and Table Type | Applicability | Characteristics |
|---|---|---|
| Policy_Entry | Policy directive that contains one or more terms referring to inline attributes or named sets (values in other tables) to enforce a policy action. It is also a root node in policy code generation logic. All other objects may be leaf nodes in policy code generation, which means the leaf nodes are foreign table objects referenced by root node. | Policy entry table is the aggregate that creates policy rules by combining information from other policy tables that represent prefixes, as-paths, communities, ext-communities etc. Policy entry also embeds information to combine with the next ordinal as and or not condition. |
| Policy_IPv4 Prefix | Policies using IPv4 prefixes in combination to keywords that define boundaries of various prefix subnets. Holds information about IPv4 prefixes. The address is a standard dotted-decimal IPv4. The optional minimum matching length follows the address and optional mask length and is expressed as the keyword GE (mnemonic for greater than or equal to), followed by a non-negative decimal integer in the range from 0 to 32. The optional maximum matching length follows the rest of the syntax and is expressed by the keyword LE (mnemonic for less than or equal to), followed by another non-negative decimal integer in the range from 0 to 32. | A syntactic shortcut for specifying an exact length for prefixes to match is the keyword EQ (mnemonic for equal to). If a prefix match specification has no mask length, then the default mask length is 32 for IPv4. The default minimum matching length is the mask length. If a minimum matching length is specified then the default maximum matching length is 32 for IPv4, if neither minimum nor maximum is specified, the default maximum is the mask length. |
| Policy_IPv6 Prefix | Policies using IPv6 prefixes in combination to keywords that define boundaries of various prefix subnets. Holds information about IPv6 | A syntactic shortcut for specifying an exact length for prefixes to match is the keyword EQ. If a prefix match specification has no mask length, then the default mask length is 128 |

TABLE 1-continued

| Policy Object and Table Type | Applicability | Characteristics |
|---|---|---|
| | prefixes. The address is a standard colon-separated hexadecimal IPv6 address. The mask length, if present, is a nonnegative decimal integer in the range from 0 to 128 following the address and separated from it by a slash. The optional minimum matching length follows the address and optional mask length and is expressed as the keyword GE, followed by a nonnegative decimal integer in the range from 0 to 128. The optional maximum matching length follows the rest and is expressed by the keyword LE, followed by another non-negative decimal integer in the range from 0 to 128. | for IPv6. The default minimum matching length is the mask length. If a minimum matching length is specified, then the default maximum matching length is 128 for IPv6. Otherwise, if neither minimum nor maximum is specified, the default maximum is the mask length. |
| Policy_As_Path Policy_Community | Policy AS_PATH or community objects represent AS_PATH or community. AS path table or community comprises operations for matching an AS path and community attribute. The matching operations are organized as regex-name: Or ASPath/Community value | Table and related objects can be used to represent a named set for AS Paths and communities. |
| Policy_Extended Community | An extended community is a 64-bit quantity. Integer community values may be split in half and expressed as two unsigned decimal integers in the range from 0 to 65535, separated by a colon. | Table and related objects can be used to represent a named set with a value and/or regular expression for extended communities. |
| Policy_Large_Community | Policy Large Community encompasses a large community in BGP. | Table and related objects can be used to represent a named set with a value and/or regular expression for large communities. |
| Policy_Regex | Policy tables may be based on Regular Expressions (Regex). Such embodiments allow a regular expression to be compiled and compared with a value for policy evaluation. | Regular expressions can be used for comparison of AS_PATH, Communities, Large Communities, Extended Communities, Route Distinguishers and Route Targets. |
| Policy_Opaque | A policy opaque may be used to represent various basic type objects like uint32, uint64 etc., and used for maintaining references to external tables such as (but not limited to) columnar databases, graph databases etc. The data model may be extended to add new types. | Extensibility in the framework that allows addition of new user defined types. Note that a separate type may be evaluated to prevent increasing the types. However, the framework provides for extensibility as needed. |
| Policy Foreign Table | Used to reference a foreign table that is native BDS or non-BDS. | Provides for referencing objects from tables which are non-BDS, thereby providing for incorporation of policy logic based on external tables defined as BDS, JSON, or any other table which may be defined in graph/columnar database. |

The policy described herein may be useful for both control and data plane aspects, and the policy may be used to create rules to match and set actions on criteria verification. For instance, a policy.filter.json table may hold a definition of all firewall and data plane constructs which are provided via a forwarding daemon (FWDD). In this embodiment, the processing and conversion of filters to data plane terms may be performed by the FWDD using the policy.filter.json table or policy generated based thereon.

A policy entry may be a root object that creates a term using inline values, which are scalar values, associated with the policy entry, or a named set, which is a foreign table and/or object, associated with the policy entry. A policy entry may be processed to generate a high-level programming code, such as C, which represents interactions (such as "and", "or," "not") between nodes. A policy entry node refers to various types node names, such as Policy-Regex, Policy-Filter, Policy-IPv4Prefix, Policy-IPv6Prefix, Policy_As_path, Policy_Community, Policy_Extended_Community and Policy_Opaque, etc. Such a layout may be extensible such that, when a new type of policy entry node is defined, the new type of policy entry node can be added as an inline type to a policy entry object and also as a Policy *type to the list of policy object(s). Referring to Table 2 below, an example layout of a policy object is shown. Specifically, an example policy object, default_policy_AS5432_FILTER_IN, is shown.

TABLE 2 default_policy_AS5432_FILTER_IN

| | |
|---|---|
| Ordinal =10, subordinal =1, match | as_path = 8071 |
| Ordinal =10, subordinal =2, match | foreign_table": "default_policy_AS5432_test_and_set_prefix |
| Ordinal =20, subordinal =1, set_path_attribute | Med = 777 |

In some embodiments, a policy may include two difference classes of policy objects which may be maintained in separate tables. The policy may include a root policy object and a leaf policy object. A policy-entry object may be a policy object that combines one or more leaf or root objects to create an aggregate rule. A policy entry is a root object that combines information from one or more objects in a table (which may be a foreign, or different table separate from the table containing the root object) that contains leaf policy-objects. A leaf object may be a policy object that can be a part of a policy table or a foreign table referenced in the policy table of the root object. Examples of leaf policy objects are IPv4 prefix, IPv6 prefix, AS_Path, Community, Extended_Community etc. Thus, a leaf object may be one of a number of different types of objects.

Figure 4:
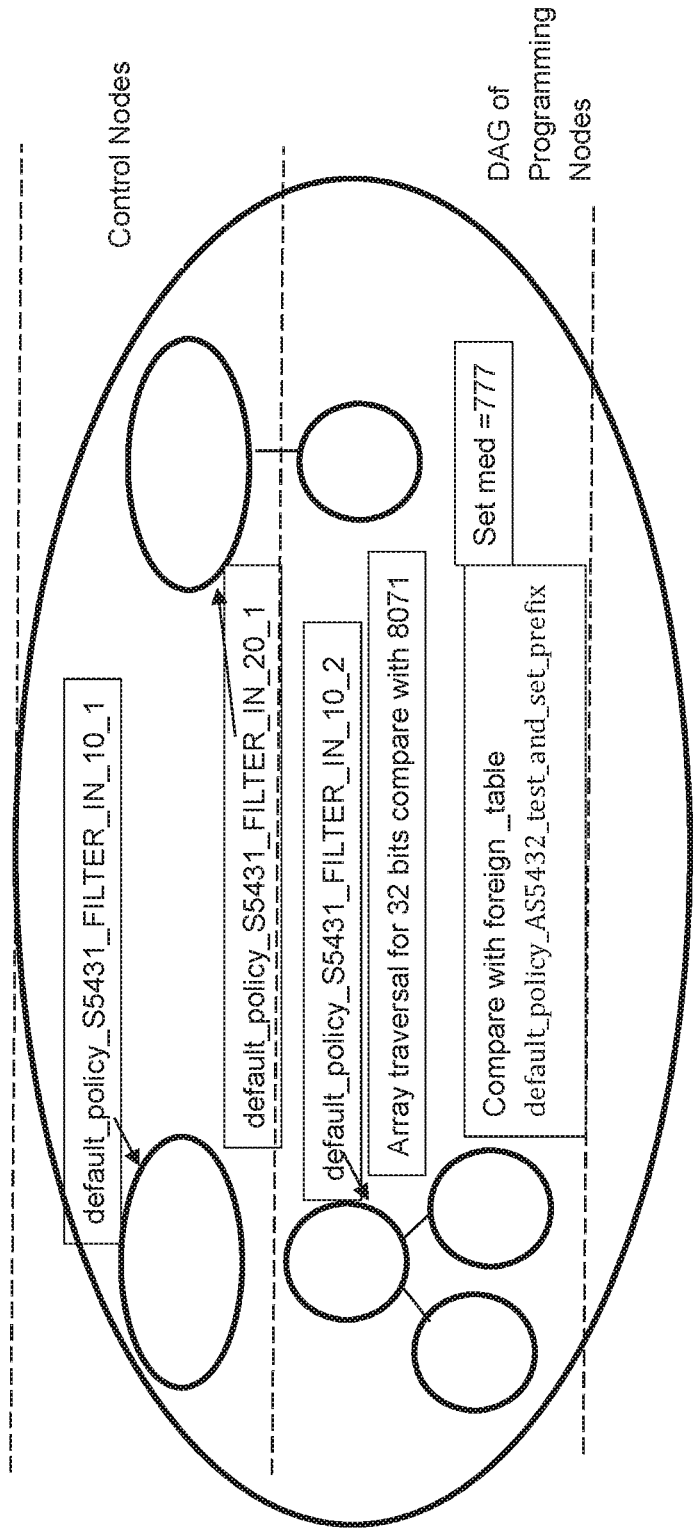
FIG. 4 is an architecture for generating code based on a policy.

Referring to FIG. 4, depicted is an architecture for generating code based on a policy object, such as the policy object described in table 2. In this example, policy processing includes two aspects: the processing pipeline and the code generation engine. The processing pipeline may be the operational end of processing a policy, whereas the code generation engine produces the actual code for taking specific actions (e.g., implementing the intent of the policy). For example, a flow combining a policy entry and prefixes to set values could be:

Policy Entry Table default_policy_S5431_FILTER_IN is the policy entry table and hence the name of the main policy Ordinal 10 sub-ordinal 1 refers to policy which is default_policy_S5431_FILTER_IN_10_2 and is the second sub-ordinal under the same ordinal. This compares an AS Path number.

Ordinal 20 sub-ordinal 1 refers to an action which, in this case, sets the med path attribute.

The code generation engine may create, operate, or otherwise use three types of nodes for dividing the load of code generation. For instance, the code generation engine may create a container node, a control node, and a programming node. The container node may be the policy table and overarches all other snippets or portions of code. The control node may be a set of nodes associated with leaf objects and define the creation of the DAG per leaf object. The programming node may be the node which parses through the list of control nodes and traverses that associated DAG for generating code.

In the example architecture depicted in FIG. 4, the code generation engine may parse the policy entry table (shown in table 2) to convert the policy entry table to a node DAG which combines the two main prefix tables (e.g., the default_policy_S5431_FILTER_IN_10_2 referring to default_policy_S5432_test_and_set_prefix). The code generation engine may create a container node which refers to the specific policy. The code generation engine may create control nodes, which represent the first node in the ordinal/sub-ordinal combination, and multiple such nodes which represent the control node. The code generation engine may use or otherwise include programming nodes which assist, map, or otherwise determine the associated logic corresponding to the control nodes. The programming nodes (such as programming nodes for programming in C) may include logical primitives, looping primitives, etc., applied to a set of arrays of int u32. The policy entry may also include the set of commands for setting path attributes. For instance, a command may include a local-preference and med in an object received from a client (such as BGP) in a native system format (such as BDS format). The code generation engine may generate code corresponding to the commands for instantiating the policy.

The code generation engine may create a job which schedules conversion of the policy into an intermediate representation (such as a DAG), followed by code generation (such as in a programming language, like C), and compilation to build a tablename.so (e.g., a shared library for a policy).

According to embodiments where code generation and code execution are separated (e.g., where code is generated at the policy server and executed at the policy client), operators/users may be provided visibility into the policy logic. Access to logic in high-level programming like C, Go etc. provides operators the ability to audit and alter the logic per their needs. Such embodiments are also extensible, as these embodiments provide users the ability to add new node objects and corresponding code generation with definitions in BDS format. Operators can use this de-coupling of code generation and code execution to plug-n-play their own policy logic. The multi-stage policy processing provides for a pipeline which may initially be for inter and intra-domain routing and such embodiments may be leveraged in other networking environments. The embodiments described herein may be used in conjunction with telemetry data to form a closed loop control system that adapts policies per the current state of the network in high performance use cases such as gaming, latency sensitive applications, etc.

Once the code is generated (e.g., by the code generation engine) the code nay be copied to a directory which contains all auto generated code. The code may be compiled to build the specific policy binary. All accessor (leaf node) related code can either be auto generated through the same code generation engine or crafted separately. All the accessory binaries may be linked together in a helper library which is then linked to each Policy table.so. The code generation engine may generate a SHA512 hash, which is then stored as a table attribute. The policy state (e.g., described with reference to FIG. 2) may be updated to ESTABLISHED.

According to the embodiments described herein, the benefit of the storing the SHA512 hash key is that, at any point, SHA512 may be run on the dynamic library and compared with the value in the table, which may act as a security measure for cross-checking the policy. Such embodiments may prevent a malicious user from modifying the policy entry code. The table state may provide an easy way for policy-client to decide whether to process a specific policy or not.

As table updates and objects are made, the code generation engine may automatically receive such updates. The code generation engine may automatically generate code as part of policy processing. The code generation engine may maintain a context of the code generated, stale entries and file generation, all of which are tracked by a state machine as shown in FIG. 3. Thus, the code generation engine may determine whether new code is needed.

Referring back to FIG. 1, the policy engine 106 may identify the policy objects converted by the policy parser 104. The policy engine 106 may convert the policy objects into policy primitives, such as as-path, prefixes, communities, extended-communities, route-distinguishers and route-targets, which may have represented as in-line values or named sets of objects. In some embodiments, some objects (or a group of objects) may be converted into complex primitives, which may be an aggregator of several primitives described above. Such complex primitives may also be referred to herein as nodes in a DAG.

The policy engine 106 may map the defined policy rules to a set of relationships and, ultimately, to underlying data structures. The policy engine 106 may execute algorithms that convert the intent of the policy into control plane rules. Since the policy interacts with data packets on the data plane, and rules may call for optimization for performance, the rules may be converted into a bit vector logic that executes on the hardware, or other formats which are optimized to perform line rate packet processing (such as extended-Berkeley Packet Filter (e-BPF)).

The policy dispatcher 108 may dispatch the control plane rules (or other logic) to the subscribers. In some embodiments, the policy dispatcher 108 may dispatch a notification to the subscribers, and the subscribers may retrieve the control plane rules (or other logic) to the subscribers. Thus, the policy dispatcher 108 may dispatch the control plane rules (or other logic) to the subscribers either on-demand or automatically.

Figure 5:
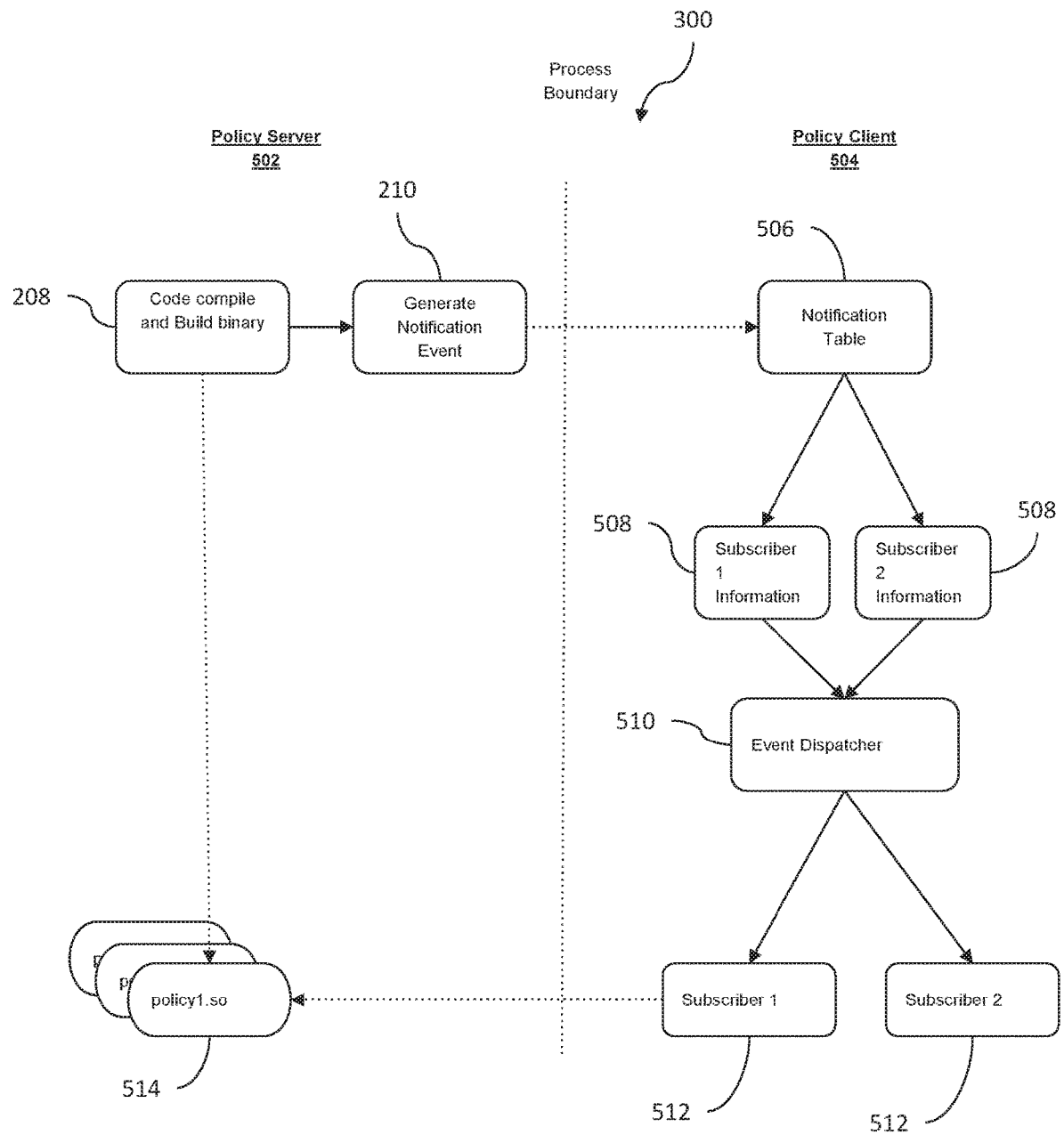
FIG. 5 is a block diagram showing the policy client server processing pipeline.

Referring to FIG. 5, depicted is a block diagram 500 showing the policy client server processing pipeline. The policy server processing pipeline represented by the block diagram 200 of FIG. 2 may be performed by a policy server 502 (which is represented on the left-hand side of the block diagram 500). A policy client server processing pipeline may be performed by a policy client 504 (which is represented on the right-hand side of the block diagram 500). The policy client 504 may be a shared library which links to various applications. The policy client 504 may receive notifications on changes of the policy (e.g., from the policy dispatcher 108 at the policy server 502). In some embodiments, the policy client 504 may identify notifications in a notification table 506, which may be updated, revised, modified, or otherwise maintained by the policy server 502. The policy client 504 may maintain a list of subscribers 508 for a specific policy. The subscriber information in the list of subscribers 508 may be, for instance, an internet protocol address, or other identifier for specific subscribers 512. Subscribers 512 may be network devices which are registered to use or otherwise maintain a particular policy. The policy client 504 may reconcile the list of subscribers 508 with the notification indicating changes of the policy and generate a notification to a client daemon. An application daemon may evaluate and enforce a specific policy binary 514 when subscribers 512 for the policy binary 514 are identified and the policy binary 514 is verified and processed.

Referring now to FIG. 2 and FIG. 5, the policy server processing pipeline may include two stages. The first stage may be managed by a policy server 502, and the second stage may be managed by a policy client 504. In some embodiments, the policy dispatcher 108 may send, communicate, distribute, or otherwise dispatch a notification to the policy client 504. In some embodiments, the policy dispatcher 108 may update, revise, etc. a policy global notification table 506, and notifications from the policy global notification table may be communicated to the policy client(s) 504. When the policy client 504 receives a notification which indicates a policy update, the policy client 504 may verify that the client daemon has subscribed to the policy. The policy client 504 may execute a hysteresis logic, which may suppress frequent policy event updates, by providing for smearing prior to processing the event (e.g., the policy update). When the policy client 504 performs the verification and hysteresis logic, the policy client 504 may generate a callback for an application daemon. For instance, the policy client 504 may operate, include, or otherwise control an event dispatcher 510. The event dispatcher 510 may communicate with, be a component of, or may include the application daemon. The application daemon may evaluate and enforce the specific policy binary 514.

In some embodiments, the policy client 504 may be a component or aspect of the forwarding application or forwarding daemon (FWDD). The policy client 504 may convert data policy attributes into primitives and perform filtering in the forwarding plane. The policy client 504 may optimize the conversion to bit vectors or BPF or e-BPF, via Forwarding Daemon.

According to these embodiments, a policy may be used in both (or either) the control and data plane as well. The policy can be used to create rules to match and set actions on criteria verification. A policy filter JSON table holds the definition of all the firewall and data plane constructs enabled via the FWDD. The actual processing and conversion of the filters to data plane terms and actions may performed by FWDD.

The policy server 502 (which may also be referred to herein as Libpolicy-server) may execute the processing pipeline depicted in FIG. 5. For instance, the policy server 502 may service table-related processing (e.g., according to table 1). The policy server 502 may trigger the code generation engine, which generates computer code in accordance with the policy. The policy server 502 may compile the computer code and generate a shared library. In some embodiments, the policy server 502 may generate a shared library for each policy table, or for a set of policy tables. In instances where a root object of a table is a code generation node, (e.g., Policy Entry libpolicy-server), the policy server 502 may refer to foreign objects (e.g., objects in a foreign table) that provide accessors for performing, for instance, "get" and "set" operations to underlying table objects. The policy server 502 may manage individual policy tables (and objects within the table).

The policy client 504 may be a shared library and has a pipeline as shown in FIG. 5. The policy client 504 may be linked with subscribers (or clients) which may require policy support. The policy client 504 may subscribe to the global notification table, which is maintained by the policy server 502, via a publish-subscribe listener. Thus, the policy client 504 may obtain notifications relating to all policies generated or otherwise maintained by the policy server 502. Notification updates to the global notification table may trigger a review of new rules within the policy associated with policy tables installed, maintained, operating on, or otherwise used by subscribers.

In some embodiments, a client application (or daemon) for each (or a group of subscribers), such as BGP, ISIS etc., may express interest in, request access to, or otherwise identify a specific policy table, policy object or policy attribute. The interest expressed by the client application may be identified, flagged, maintained or otherwise registered (or deregistered) by the policy client 504 in a subscriber table. The client application may invoke executable binary which is associated with a policy rule and can be applied on the corresponding object for the policy. The client application may interact with the publish-subscribe system such that notifications can be generated and identified upon updates of the policy table and/or individual policy object(s).

In some embodiments, the policy client 504 may be a component of, incorporate, or otherwise be a part of client daemons, such as BGP, ISIS, etc. The policy client 504 may include a component, module, agent, and/or engine that includes a listener which receives notifications corresponding to the availability of new policy table-related code which was generated by the policy server 502. The policy client 504 may evaluate the compiled code. The policy client 504 may determine whether there are any other listeners or interests, based on the evaluated, compiled code. The policy client 504 may notify components within the client daemon of results of the evaluation (e.g., applicability, whether there are any listeners/interests, subscribers). The policy client 504 may trigger internal processing in some instances. The policy client 504 may trigger internal processing, such as routing policy re-computation, route filtering, attribute updates (which may impact path attributes), etc.

Figure 6:
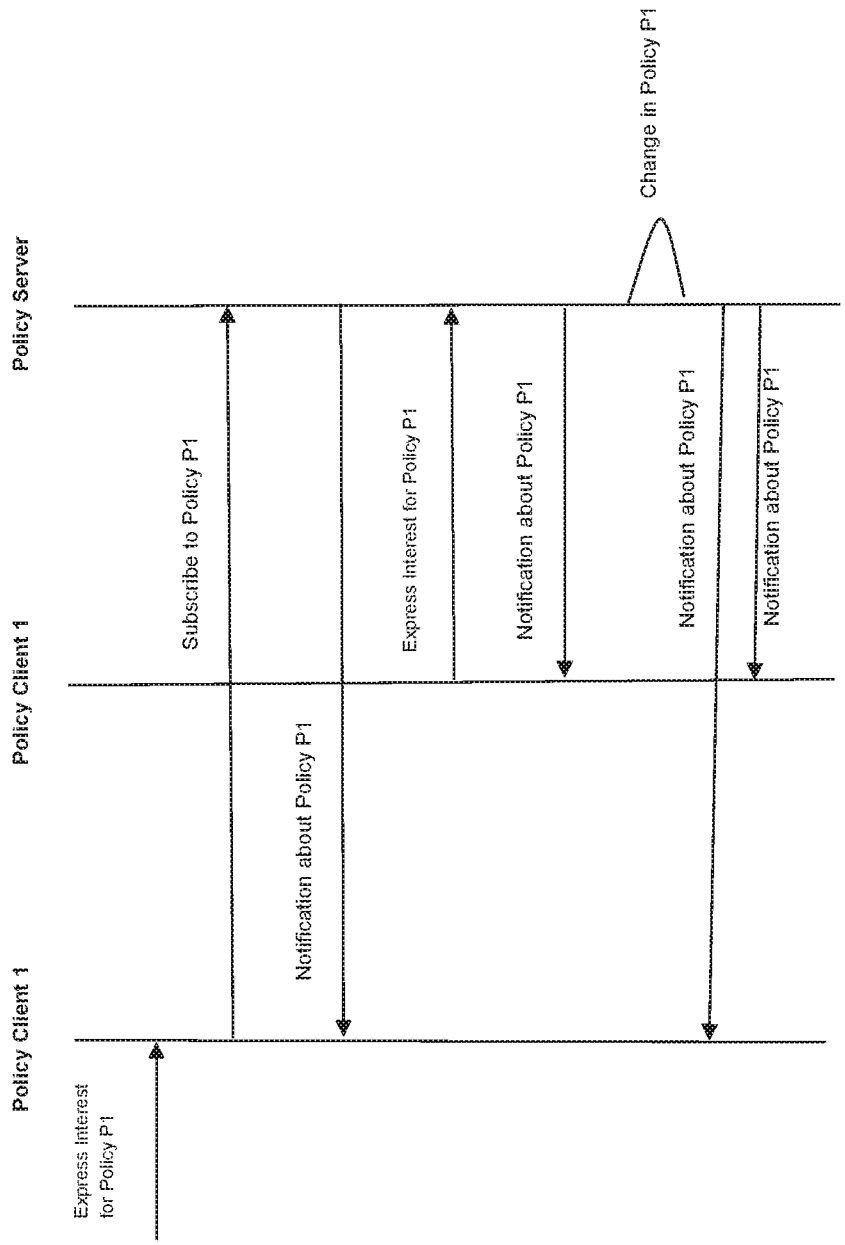
FIG. 6 is a sequence of policy processing.
Figure 7:
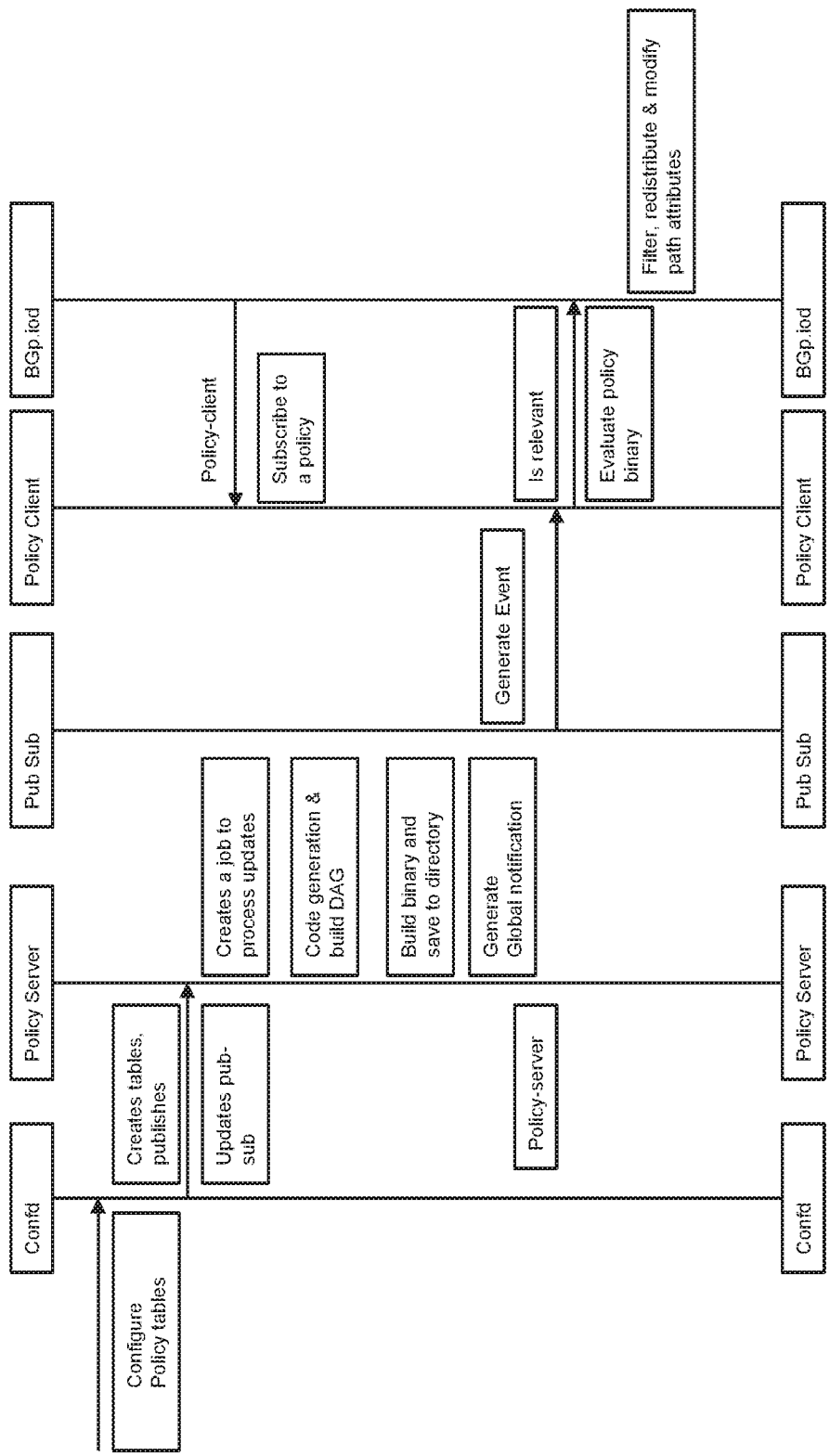
FIG. 7 is a sequence of interactions in policy processing.

Referring now to FIG. 6 and FIG. 7, depicted is a sequence of policy processing. Specifically, FIG. 6 is a sequence of policy processing, and FIG. 7 is a sequence of interactions in policy processing. According to some embodiments, the policy server processing depicted in FIG. 2 may commence independent of (or asynchronously with respect to) the policy client processing (e.g., the policy client and policy server may operate independently of one another). In some embodiments, policy rules may be introduced to the policy server processing by, for instance, CLI, REST, or other policy table configuration changes or modifications. The policy table and associated objects may be instantiated in, for instance, confD. The policy server may subscribe to the table updates using, for instance, BDS regex capability (e.g., subscribing to ".*policy.*").

The policy client may be a part of, a component of, or incorporate application daemons (or client applications) such as BGP, ISIS etc. On start-up, such client applications may register a set of call back functions with the policy client.

The policy client may expose an interface to client applications for registering interest for subscribing (and unsubscribing) to updates of specific routing policies. Thus, client applications may register with specific policies to thereby obtain updates to specific policies. Such registration permits a client application to de-couple between the policy configuration and enforcement.

The policy client may include a notification table that processes all system notifications. The notification table may be maintained/updated by the policy server. In this regard, the policy client and policy server may be coupled to one another via the notification table, but otherwise separate (or decoupled). A notification may be generated (e.g., via the policy dispatcher) in response to code generation and compilation in a specific directory. The notification may be provided to the notification table. In some embodiments, the policy client may include an interface, such as Linux iNotify, that triggers events relating to specific file updates. The notification may provide for state compression and fine granularity notification suppression, which may build a degree of hysteresis and prevent spurious events from triggering policy client processing.

Figure 8:
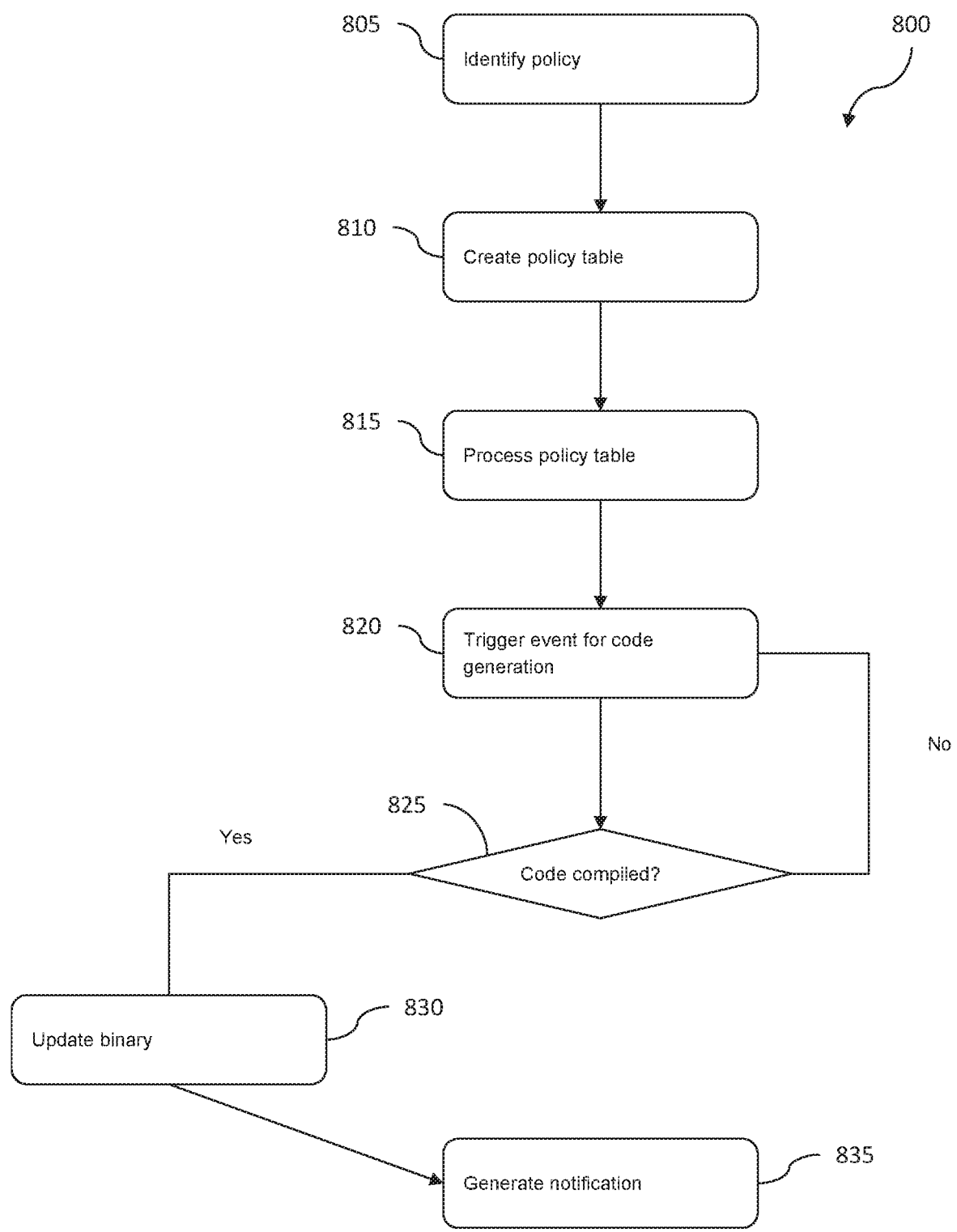
FIG. 8 is a flow diagram of an embodiment of a method of generating a policy.

In some embodiments, on receipt of a notification event (e.g., an update to the notification table), the policy client may determine whether a subscriber has subscribed to the table corresponding to the notification. The policy client may maintain a plurality of subscriber tables which identify subscribers for a specific policy. Additionally, the policy client may maintain a subscriber table including identifiers for several subscribers and the corresponding policy (or policies) to which they subscribe. The policy client can compare an identifier for the policy from the notification to the subscriber table(s) to determine which subscribers subscribe to the updated policy. Where a subscriber has subscribed to the policy corresponding to the notification, the policy client may invoke a call back function, which is registered by the client application, as depicted in FIG. 8. The client application may invoke a policy API to process the specific policy via a communications interface between the client application and the policy client. The policy API may invoke the policy table.so function and, on completion of processing the appropriate policy action, route filtering, path attribute update or policy filter, the policy API may create an action in the data plane for processing.

The client application may register interest in specific policies via the policy-client library. The client application may determine whether the global notification table has any past notifications relating to the policy of interest, and if such policy binaries were created prior to the client daemon registering interest. The client application may trigger evaluation of the policies relating to the client daemon.

Referring to FIG. 8, depicted is a flow diagram 800 of one embodiment of a method of generating a policy. The functionalities of the method may be implemented using, or performed by, the components detailed herein in connection with FIGS. 1-7. The steps described in the flow diagram 800 are only one example embodiment of the method. The steps may be performed in a different chronological order. Additional steps may be substituted for (or added to) the steps outlined in the flow diagram 800. Furthermore, in some embodiments, some steps may be omitted.

A policy parser may identify a policy at operation (805). In some embodiments, the policy parser may identify a policy configured in a configuration database. A user, such as a network administrator, may generate the policy in the configuration table. The policy may be an aspect of (or generally) a policy data model. The policy data model may be a set of objects defined in a human-readable format, such as JavaScript Object Notation (JSON). The objects may include relationships amongst various tables, as described below.

The user may generate the policy using, for instance, a configuration application or configuration daemon. The user may provide inputs to the configuration application which are communicated to or otherwise used for configuring the policy in the configuration database. The user may generate the policy based on network needs, for instance. The policy parser may be communicably coupled to the configuration database.

In some embodiments, the policy parser may be located at (or a component of) a policy server. Additionally, in some embodiments, the configuration database may be located at (or a component of) the policy server. The policy parser may include a listener which identifies the policy at the configuration database.

The policy parser may create a policy table at operation (810). In some embodiments, the policy parser may create the policy table corresponding to the configuration of the policy as reflected in the configuration database. The policy table may include one or more policy objects, where each object is an autonomous stand-alone unit of execution defined in a human-readable format (such as JSON). In some embodiments, the policy object includes an ordinal and sub-ordinal. The ordinal and sub-ordinal may define an order in which commands are evaluated and sent to a code generation engine, as described below.

In some embodiments, the policy table may include a policy state and a policy hash. The policy state may indicate whether the policy is in an instantiated state, a build state, or an established state. The instantiated state may indicate that the policy table is defined and one or more objects in the table are instantiated. The build state may indicate that the policy table is being parsed, a route map is being generated, code is being generated, and/or code is being compiled. Accordingly, the build state may generally indicate that the code for the portion of the policy represented in the table is being built. The established state may indicate that compilation of the policy for the table is successful (e.g., the policy is ready for processing). In some embodiments, only policies in the established state are to be processed by the policy client.

The policy hash may permit a policy client to audit the policy. The policy hash may be, for instance, SHA-512 (a 512 bit value generated on a 64b system). The policy hash may ensure consistency between an object file (for instance a shared object, or .so, file) in a directory and the value computed in the table (e.g., the internal value of the hash). The policy hash may act as a security measure which prevents malicious or inadvertent changes to a policy and excludes policy processing on such changes, thereby preventing or inhibiting collateral damage.

In some embodiments, the policy table may include root policy objects and leaf policy objects. A policy-entry object may be a policy object that combines one or more leaf or root objects to create an aggregate rule. A policy entry may be a root object that combines information from one or more objects in a table (which may be a foreign, or different table separate from the table containing the root object) that contains leaf policy-objects. A leaf object may be a policy object that can be a part of a policy table containing or including the root object or a foreign table referenced in the policy table of the root object. Examples of leaf policy objects are IPv4 prefix, IPv6 prefix, AS_Path, Community, Extended_Community etc. Thus, a leaf object may be one of a number of different types of objects.

The policy parser may process the policy table at operation (815). In some embodiments, the policy parser may process the configuration of the policy table and update a policy entry. In some embodiments, the policy parser may identify changes/modifications/updates/alterations/etc. to the policy made by the user. The user may modify the policy using, for instance, a configuration application or client daemon. The user may modify the policy based on new or uncovered network needs, to change the policy, etc. As stated above, the policy parser may be communicably coupled to the configuration database. When the user provides updates/revisions/modifications to the policy, such updates/revisions/modifications may be reflected in the configuration database. The listener of the policy parser may identify the updates/revisions/modifications to the policy as reflected in the configuration database.

In some embodiments, the policy parser may update the policy table as the configuration database is updated by the user. In these embodiments, the policy parser may generate the policy table at a first instance, and the policy parser may update the policy table as the user updates the configuration table (e.g., via the configuration application or daemon).

The policy parser may trigger an event for code generation at operation (820). The event may be a flag to a policy engine to generate code for the updated or new policy. The event may be triggered by the policy parser responsive to creating the policy table (e.g., at operation 810), and/or responsive to the policy parser processing the configuration of the policy table and updating the policy entry (e.g., at operation 815).

The policy engine may compile the code at operation (825). The policy engine may generate and compile the code corresponding to the policy table (from operation 815). The policy engine may loop through operations (820) and (825) until code corresponding to the policy data model is generated and compiled. In some embodiments, the policy engine may construct a dynamic acyclic graph (DAG) representing the policy data model. The objects represented in the policy table may be used for generating nodes in the DAG. The policy engine may generate the DAG using the policy objects (as represented in the policy table). The DAG may be a graph of nodes which maps object relationships.

The policy engine may parse the DAG to generate code in a high-level language. The policy engine may include a code generation engine. The code generation engine may convert the nodes of the DAG into a high-level language. For instance, the code generation engine may convert the nodes of the DAG into C. The code generation engine may convert the nodes of the DAG and connections therebetween into the high-level language. Thus, the code generation engine may generally convert the DAG into a high-level coding language.

The policy engine may map the defined policy rules to a set of relationships and, ultimately, to underlying data structures. The policy engine may execute algorithms that convert the intent of the policy into control plane rules. Since the policy interacts with data packets on the data plane, and rules may necessitate optimization for performance, the rules may be converted into a bit vector logic that executes on the hardware, or other formats which are optimized to perform line rate packet processing (such as extended-Berkeley Packet Filter (e-BPF)).

The code generation engine may use or otherwise include programming nodes which assist, map, or otherwise determine the associated logic corresponding to the control nodes. The programming nodes (such as programming nodes for programming in C) may include logical primitives, looping primitives, etc., applied to a set of arrays of integers, such as int u32. The policy entry may also include the action commands for setting path attributes. For instance, a command may include a local-preference and med in an object received from a client (such as BGP) in a native system format (such as BDS format). The code generation engine may generate code corresponding to the commands for instantiating the policy.

The code generation engine may create a job which schedules conversion of the policy into intermediate representation (such as a DAG) followed by code generation (such as in a programming language, like C) and compilation to build a tablename.so (e.g., a shared library for a policy).

In some embodiments, the generated code may be compiled using an Ahead of Time (AoT) compiler. The AoT compiler may be a GNU compiler. For accessor functions (e.g., "get" and "set" functions), end users may use a compiler that is available with the specific database or ASIC. Thus, the systems and methods described herein may be a hybrid approach where some processing may be performed (e.g., at the policy server and policy client), while the user may intervene and make changes in-line, as needed.

When the code is compiled, the method may proceed to operation (830). The policy engine may update the binary at operation (830). Once the code is generated (e.g., by the code generation engine) the code may be copied to a directory which contains all auto generated code (e.g., the binary for implementing the policy). The code may be compiled to build the specific policy binary. All accessor (leaf node) related code can either be auto generated through the same policy code generation engine or crafted separately (as described above). All the accessory binaries may be linked together in a helper library which is then linked to each shared library. The code generation engine may generate a SHA512 hash, which is then stored as a table attribute. The policy state (e.g., represented in FIG. 2) may be updated to ESTABLISHED.

A policy dispatcher may generate a notification at operation (835). The policy dispatcher may generate the notification to update or otherwise render the notification at a global notification table. A policy client may include a listener which identifies updates to the global notification table. The policy client may identify updates the global notification table corresponding to the updated policy. The policy client may retrieve the updated code and provide the updated code to subscribers for implementing the policy.

Referring to FIG. 9, depicted is a flow diagram 900 of an embodiment of a method of implementing a policy for a network device. The functionalities of the method may be implemented using, or performed by, the components detailed herein in connection with FIGS. 1-7. In brief overview, a policy parser identifies a policy data model (905). A policy engine constructs a dynamic acyclic graph representing the policy data model (910). A code generation engine generates code (915). The policy engine compiles the code (920). A policy dispatcher generates a notification (925).

A policy parser identifies a policy data model at operation (905). The policy parser may be implemented in or a component of a policy server. The policy parser may identify the policy data model in a configuration database. The policy data model may be associated with a policy. The configuration database may be implemented in or a component of the policy server. The policy data model may be generated by a user via a configuration application or daemon. The policy data model may include a policy object which is expressed in human-readable format. In some embodiments, the policy object may be expressed in JavaScript Object Notation (JSON). In some embodiments, the policy object includes an ordinal and sub-ordinal. The ordinal and sub-ordinal may define an order in which commands are evaluated and sent to a code generation engine, as described below.

The policy parser may be communicably coupled to the configuration database. The user may generate the policy using, for instance, a configuration application or configuration daemon. The user may provide inputs to the configuration application which are communicated to or otherwise used for configuring the policy in the configuration database. The user may generate the policy based on network needs, for instance. For instance, the policy parser may include a listener which identifies the policy at the configuration database.

The policy parser may create a policy table corresponding to the configuration database at operation. The policy table may include one or more policy objects, where each object is an autonomous stand-alone unit of execution defined in a human-readable format (such as JSON), indexed by ordinal and sub-ordinals to define the order of execution.

In some embodiments, the objects in the policy table may include a policy state. The policy state may indicate whether the policy is in an instantiated state, a build state, or an established state. The instantiated state may indicate that the policy table is defined and one or more objects in the table are instantiated. The build state may indicate that the policy table is being parsed, a route map is being generated, code is being generated, and/or code is being compiled. Accordingly, the build state may generally indicate that the code for the portion of the policy represented in the table is being built. The established state may indicate that compilation of the policy for the table is successful (e.g., the policy is ready for processing). In some embodiments, only policies in the established state are to be processed by the policy client.

In some embodiments, the policy object may include a security measure for auditing the policy and/or policy objects within the policy. The policy client and/or policy server may audit the policy using the security measure. For instance, the security measure may be a value used for comparison to values calculated via the policy.

In some embodiments, the security measure may be a policy hash. The policy hash may permit a policy client to audit the policy. The policy hash may be, for instance, SHA-2 (such as SHA-512 a 512 bit value). The policy hash may ensure consistency between an object file (for instance a shared object, or .so, file) in a directory and the value computed in the table (e.g., the internal value of the hash). The policy hash may act as a security measure which prevents malicious or inadvertent changes to a policy and excludes policy processing on such changes, thereby preventing or inhibiting collateral damage.

In some embodiments, the policy table may include root policy objects and leaf policy objects. A policy-entry object may be a policy object that combines one or more leaf or root objects to create an aggregate rule. A policy entry is a root object that combines information from one or more objects in a table (which may be a foreign, or different table separate from the table containing the root object) that contains leaf policy-objects. Thus, the foreign table may be an external in-memory database, a relational database, a graph database, or a NoSQL database., so long as the index is a name-space. A leaf object may be a policy object that can be a part of a policy table or a foreign table referenced in the policy table of the root object. Examples of leaf policy objects are IPv4 prefix, IPv6 prefix, AS_Path, Community, Extended_Community etc. Thus, a leaf object may be one of a number of different types of objects.

A policy engine constructs a dynamic acyclic graph (DAG) representing the policy data model at operation (910). The policy engine may be implemented in or a component of the policy server. The policy engine may construct the DAG from the policy data model (e.g., from operation 905). The objects represented in the policy table may be used by the policy engine for generating nodes in the DAG. The policy engine may generate the DAG using the policy objects (as represented in the policy table). The DAG may be a graph of nodes which maps object relationships.

A code generation engine may generate code at operation (915). The policy engine may parse the DAG to generate code in a high-level language. The policy engine may include the code generation engine. The code generation engine may convert the nodes of the DAG into a high-level language. For instance, the code generation engine may convert the nodes of the DAG into C. The code generation engine may convert the nodes of the DAG and connections therebetween into the high-level language. Thus, the code generation engine may generally convert the DAG into code.

The policy engine compiles the code at operation (920). The policy engine may compile the code to generate binaries for implementing the policy. The policy engine may map the defined policy rules to a set of relationships and, ultimately, to underlying data structures. The policy engine may execute algorithms that convert the intent of the policy into control plane rules. Since the policy interacts with data packets on the data plane, and rules may necessitate optimization for performance, the rules may be converted into a bit vector logic that executes on the hardware, or other formats which are optimized to perform line rate packet processing (such as extended-Berkeley Packet Filter (e-BPF)).

The code generation engine may use or otherwise include programming nodes which assist, map, or otherwise determine the associated logic corresponding to the control nodes. The programming nodes (such as programming nodes for programming in C) may include logical primitives, looping primitives, etc., applied to a set of arrays of integers, such as int u32. The policy entry may also include the set of commands for setting path attributes. For instance, a command may include a local-preference and med in an object received from a client (such as BGP) in a native system format (such as BDS format). The code generation engine may generate code corresponding to the commands for instantiating the policy.

In some embodiments, the generated code may be compiled using an Ahead of Time (AoT) compiler. The AoT compiler may be a GNU compiler. For accessor functions (e.g., "get" and "set" functions), end users may use a compiler that is available with the specific database or ASIC. Thus, the systems and methods described herein may be a hybrid approach where some processing may be performed (e.g., at the policy server and policy client), while the user may intervene and make changes in-line, as needed.

A policy dispatcher generates a notification at operation (925). The policy dispatcher may be a component of or incorporated into the policy server. The policy dispatcher may generate the notification for a policy client. The policy client may be corresponding dispatch the binaries to at least one subscriber of the policy. The policy dispatcher ay generate the notification following the code being compiled. Thus, the policy dispatcher may cause the policy client to asynchronously update the policy for the subscriber.

In some embodiments, the policy dispatcher may generate the notification to render, provide, communicate the notification to or otherwise update a global notification table. A policy client may be configured to monitor the global notification table to identify the update corresponding to the policy. In some embodiments, the policy client may include a listener which identifies updates to the global notification table. The policy client may identify updates the global notification table corresponding to the updated policy. The policy client may retrieve the updated code and provide the updated code to subscribers for implementing the policy.

System Benefits

Staged Pipeline Processing & Loose Coupling

Policy processing is structured as a staged pipeline with each stage de-coupled from the next stage. As such, policy processing is performed asynchronously, and therefore independent from other policy processing. The policy code generation may be applied to a root node and a leaf node. The root node may refer to multiple terms from foreign tables. The code for the foreign table may be generated via the policy code generation engine (or independently). Such accessor code for the foreign table may be "get" and "set" functions. Thus, the foreign table may be an external in-memory database, relational database, graph database or a NoSQL database.

Extensibility

New data types may be added to the policy DAG graph as leaf nodes which map to the different types either supported by the above-described systems and methods or different types. The policy DAG graph provides for new leaf nodes depending on customer use cases to be added to the processing logic.

Plug-n-Play

Policy server and Policy client processing are described as being in different stages of the policy pipeline. The coupling between the policy server and policy client is the global notification table (or Linux iNotify interface). Accordingly, accessor code may be tailored and compiled without impact to the policy enforcement path on the policy client. The policy client processing starts on receiving an asynchronous notification, which may be an operating system interface, and therefore decouples the policy server from the policy client.

Visibility

Each stage of policy processing may be visible to an end-user. The end user may evaluate the progress of the policy server (e.g., using audit information retained in the policy schedule, DAG graph, and code generation). The user may profile the performance of the table name.so code, and well known and mature tool chains may be used to evaluate the expressions. Such evaluation and profiling may provide a user with the ability to optimize the code and expressions.

Ahead of Time (AoT) compilation, which is used for generating binaries, may be applied in some embodiments. For accessor functions (e.g., "get" and "set" functions), end users may use a compiler that is available with the specific database or ASIC. Thus, the systems and methods described herein may be a hybrid approach where some processing may be performed (e.g., at the policy server and policy client), while the user may intervene and make changes in-line, as needed.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

The invention claimed is:

1. A method of implementing a policy for a networking device, the method comprising:
   identifying, by a policy server, an update to a policy data model in a configuration database associated with a policy, the policy data model including a policy object expressed in a human-readable format corresponding to the update;
   constructing, by the policy server from the policy data model, using the policy object corresponding to the update, a dynamic acyclic graph (DAG) representing the policy data model, wherein the DAG reflects the update to the policy data model;
   parsing, by the policy server, the DAG to generate code in a high-level language;
   compiling, by the policy server, the code to generate binaries for implementing the policy; and
   generating, by a policy server, a notification for a policy client to dispatch the binaries to at least one subscriber of the policy following the code being compiled, to asynchronously update the policy for the subscriber in accordance with the identified update to the policy data model.

2. The method of claim 1, wherein the policy object includes an ordinal and sub-ordinal which define an order in which commands are evaluated and sent to the code generation engine.

3. The method of claim 1, wherein the policy object is expressed in JavaScript Object Notation (JSON).

4. The method of claim 1, wherein the policy data model includes two or more objects, at least one object being a root object and at least one object being a leaf object.

5. The method of claim 4, wherein the root object is represented in a policy table, and the leaf object is represented in a foreign table.

6. The method of claim 5, wherein the foreign table is any one of an external in-memory database, a relational database, a graph database, or a NoSQL database.

7. The method of claim 1, wherein generating, by the policy server, the notification comprises:
   generating, by the policy server, an update to a global notification table, wherein the policy client is configured to monitor the global notification table to identify the update to the global notification table corresponding to the update to the policy data model.

8. The method of claim 1, wherein compiling, by the policy server, the code to generate binaries for implementing the policy comprises:
   compiling, by the policy server using an Ahead of Time (AoT) compiler, the code to generate the binaries for implementing the policy.

9. The method of claim 1, wherein the policy object further includes a security measure for auditing the policy.

10. The method of claim 9, wherein the security measure is a policy hash.

11. A policy server for generating a policy, the policy server configured to:
    identify, from a configuration database communicably coupled to the policy server, an update to a policy data model in the configuration database associated with a policy, wherein the policy data model includes a policy object expressed in a human-readable format corresponding to the update;
    construct, using the policy object corresponding to the update, a dynamic acyclic graph (DAG) representing the policy data model, wherein the DAG reflects the update to the policy data model to parse the DAG to generate code in a high-level language;
    compile the generated code to generate binaries for implementing the policy; and
    generate a notification to a policy client to dispatch the binaries to at least one subscriber of the policy following the code being compiled, to asynchronously update the policy for the subscriber in accordance with the identified update to the policy data model.

12. The policy server of claim 11, wherein the policy object includes an ordinal and sub-ordinal which define an order in which commands are evaluated and sent to the code generation engine.

13. The policy server of claim 11, wherein the policy object is expressed in JavaScript Object Notation (JSON).

14. The policy server of claim 11, wherein the policy data model includes two or more objects, at least one object being a root object and at least one object being a leaf object.

15. The policy server of claim 14, wherein the root object is represented in a policy table, and the leaf object is represented in a foreign table.

16. The policy server of claim 15, wherein the foreign table is any one of an external in-memory database, a relational database, a graph database, or a NoSQL database.

17. The policy server of claim 11, wherein the policy server is configured to generate the notification to the policy client by:
    generating an update to a global notification table, wherein the policy client is configured to monitor the global notification table to identify the update to the global notification table corresponding to the update to the policy data model.

18. The policy server of claim 11, wherein the policy server is configured to compile the generated code using an Ahead of Time (AoT) compiler.

19. The method of claim 11, wherein the policy object further includes a security measure for auditing the policy.

20. The method of claim 19, wherein the security measure is a policy hash.

* * * * *